US006640681B1

(12) United States Patent
Weber

(10) Patent No.: US 6,640,681 B1
(45) Date of Patent: Nov. 4, 2003

(54) METHOD AND DEVICE FOR SLICING FOOD PRODUCTS

(75) Inventor: Günther Weber, Bad Laasphe (DE)

(73) Assignee: Weber Maschinenbau GmbH Co. KG, Breidenbach (DE)

( * ) Notice: Subject to any disclaimer, the term of this patent is extended or adjusted under 35 U.S.C. 154(b) by 0 days.

(21) Appl. No.: 09/937,693

(22) PCT Filed: Mar. 21, 2000

(86) PCT No.: PCT/EP00/02503

§ 371 (c)(1), (2), (4) Date: Jan. 24, 2002

(87) PCT Pub. No.: WO00/59692

PCT Pub. Date: Oct. 12, 2000

(65) Prior Publication Data

(65)

(30) Foreign Application Priority Data

Mar. 31, 1999 (DE) ........................................ 199 14 707

(51) Int. Cl.[7] ............................ B26D 7/06; B26D 5/00; B23Q 15/00

(52) U.S. Cl. ...................... 83/27; 83/29; 83/73; 83/91; 83/105; 83/155.1; 83/365; 83/371; 83/932; 209/918

(58) Field of Search ................................ 209/586, 918, 209/587, 924, 911; 83/27, 29, 89, 91, 105, 106, 155.1, 155, 157, 167, 73, 75, 76.8, 365, 371, 520, 522.26, 932

(56) References Cited

U.S. PATENT DOCUMENTS 3,099,304 A * 7/1963 Monsees et al. ............ 177/121
3,480,141 A * 11/1969 Rock, Jr. .................... 209/563
3,821,913 A * 7/1974 Bajcar et al. .................. 83/92
3,846,957 A * 11/1974 Divan ......................... 53/502
4,099,434 A * 7/1978 Hardouin ..................... 83/157
4,422,815 A * 12/1983 Danhof ..................... 193/31 A
4,518,300 A 5/1985 Kent
4,548,108 A * 10/1985 Dennis .......................... 83/27
4,667,953 A * 5/1987 Hirakawa et al. ........... 271/280
5,042,340 A * 8/1991 Kasper .......................... 83/73
5,136,906 A * 8/1992 Antonissen et al. ........... 83/42
5,267,168 A * 11/1993 Antonissen et al. ........ 700/117
6,123,202 A * 9/2000 Hellenbradt ................ 209/650
6,152,004 A * 11/2000 Nispel ........................... 83/92
6,318,224 B1 * 11/2001 Hoyland ........................ 83/23
6,403,907 B1 * 6/2002 Tanimoto .................... 209/586

FOREIGN PATENT DOCUMENTS

| | | | |
|---|---|---|---|
| DE | 0449514 | A1 | 10/1991 |
| DE | 4113392 | A1 | 10/1992 |
| DE | 19518582 | A1 | 11/1996 |
| EP | 0398602 | A1 | 11/1990 |
| EP | 0398603 | A1 | 11/1990 |
| EP | 0733449 | A2 | 9/1996 |
| GB | 2239787 | A | 7/1991 |
| GB | 2267027 | A | 11/1993 |

* cited by examiner

*Primary Examiner*—Allan N. Shoap
*Assistant Examiner*—Isaac Hamilton
(74) *Attorney, Agent, or Firm*—Townsend and Townsend and Crew, LLP

(57) ABSTRACT

The invention relates to a method and to a device that allows portions of similar slices to be obtained even if the product that is sliced is changed. To this end, the slice surface is monitored. Incomplete portions are transferred to a park position subject to the slice surface monitoring. The incomplete portions are transported in a positionally accurate manner from the park position back to the collecting zone if the slice surface monitoring element detects that slices are available that match the portion.

11 Claims, 1 Drawing Sheet

METHOD AND DEVICE FOR SLICING FOOD PRODUCTS

BACKGROUND OF THE INVENTION

The invention relates to a method and to a device for slicing food products in the form of meat, sausage, cheese and the like by means of a cutting apparatus, in particular by means of a slicer, wherein the products are cut into slices and transported away in portions for further processing from a collection area disposed adjacent to the slicing apparatus by means of a feeding device, with a first feed unit having a length which can be substantially matched to the maximum length of a complete portion being used as the collection area and with an incomplete portion resulting in each case at the start and at the end of a product slicing procedure being completed after an intermediate positioning in a parking position and a return into the collection area by slices produced after the start of a further product slicing procedure and meeting determinable requirements.

Food products, in particular in the form of meat, sausage, ham, cheese and the like, are industrially sliced in very large quantities by means of so-called slicers and packed in portions. In this respect, modern slicers are in a position to execute a lot more than 500 cuts per minute, with it being possible in dependence on the movement of the respective collection surface of the individual slices to form portions in shingled form or in stack form and to lead them away for further processing in each case very rapidly from the respective collection area. In this respect, it is not only demanded in practice that the individual portions be formed with an exact weight, but the respective portions must have a perfect and high quality appearance, which is the same as saying that the individual slices of a portion must not vary too much from one another in their dimensions.

Such unwanted deviations in appearance, that is, as a rule in the size of the slices, occur above all on the transition from one sliced product to the next product to be sliced, that is, at a product change. It frequently occurs at such a product change that the residual product quantity available for the portion just sliced is no longer sufficient to reach the number of slices required for the portion, and with many products the cross-sectional area moreover changes so strongly toward the end of the product that slices are produced which are too small and which no longer meet the demands made on the portions to be formed with respect to the required appearance. To allow the respective quality and accuracy demands to be met, it is consequently still usual to employ inspectors for the constant inspection of the portions formed who have to ensure that non-acceptable portions are eliminated from the production process or manually corrected.

SUMMARY OF THE INVENTION

It is an object of the present invention to provide a method and an apparatus for slicing food products that allows a substantial increase in the economic efficiency of the slicing procedure and ensures that only perfect portions which correspond to determinable criteria are formed in the course of a product slicing procedure.

This object is satisfied in accordance with the invention substantially in that a cut surface of the product is monitored during the product slicing procedure as to whether it at least meets determinable size criteria for the supply of a slice to be sliced next into an incomplete portion and, if these criteria are not met, the product slicing procedure is interrupted and simultaneously the difference is registered between an actual value and a desired value of a size defining the complete portion; in that the incomplete portion is conveyed onto a second feed unit connected to the first feed unit into the parking position while detecting the displacement path; in that the cut surface is then again monitored during the product slicing procedure of the next product of the same kind and, if the determined criteria are met, the incomplete portion is again positionally accurately moved back into the collection area in accordance with the detected displacement path and is completed; and in that finally the completed portion is conveyed out of the collection area in the conveying direction by synchronization of at least the first feed unit with further feed elements of the feeding device.

The provided cut surface monitoring is accordingly of substantial importance for the invention in conjunction with the transporting of incomplete portions into a parking position, from which this incomplete portion is again positionally accurately moved back into the collection area for completion, when it is determined in the course of the cut surface monitoring as part of the further slicing of products that, after a phase of forming slices not suitable for the relevant portion, product slices are again available which are suitable for completion of the portion.

The method of the invention is suitable both for the forming of shingled portions and for the formation of stacked portions, since it is possible, in particular when using incrementally controlled drives in conjunction with an exact detection of the displacement path, to again guide a partial portion moved to the parking position back to the collection area so exactly while evaluating the recorded data that the next slice suitable to complete the portion is put down exactly at the desired position of the portion corresponding thereto.

It is accordingly not only ensured that portions of constant weight are obtained by a suitable feed control in the product supply, but it is above all also achieved that portions are formed within which the appearance of the slices forming the portions are largely the same or have differences only within a determinable tolerance range. It is thus possible to ensure an extremely high quality portion formation automatically and without manual corrections with high economic efficiency.

An embodiment of the invention is explained in the following with reference to the drawing.

DESCRIPTION OF THE PREFERRED EMBODIMENTS

Figure 1A:
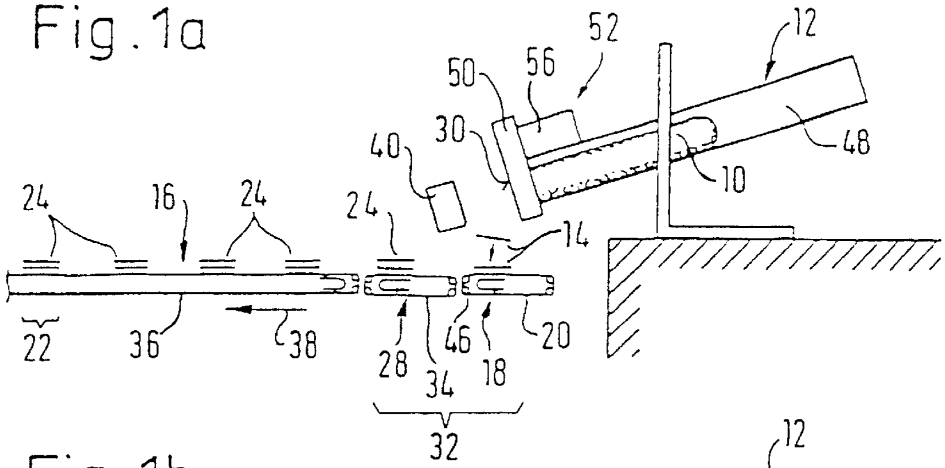
FIGS. 1*a* to 1*d* are schematic illustrations of a slicer having feeding devices disposed downstream thereof and an opto-electronic unit for the cut surface monitoring.

FIG. 1 shows a slicer 12 in schematic manner having a cutting head 52 which has a cutting element 50 designed in a known manner and set into circulation via a drive unit 56. For example, a driven circular knife circulating in a planetary manner or a sickle knife is provided as the cutting element.

The supply of each food product 10 to be sliced is carried out via a product supply device 48 which is arranged at an incline with respect to the horizontal axis.

A first feed unit is located beneath the cutting element and forms a collection area 18 for the slices 14 produced in the course of the slicing procedure. This first feeding device 20 is a belt conveyor which can be driven, which can be accurately controlled in its movements and whose length is selected such that the respectively desired shingled portions can be formed on it. A second feeding device 34 follows directly adjacent to the end 46 of this first feeding device 20 and can likewise be accurately controlled in its movements and also synchronized in movement with the first feeding device 20.

This second feeding device 34 forms a so-called parking position 28 in which an incomplete portion can be received for intermediate storage. The two feeding devices 20, 34 are expediently formed identically.

A feed element 36, which is usually likewise formed as a belt conveyor and serves to lead away the finished portions formed, follows the second feed unit 34.

An opto-electronic unit 40 is provided in a position suitable for the observation of the cut surface 30 of the respective product 10 to be sliced, said opto-electronic unit allowing a defined surface monitoring or a monitoring of the cut surface to be carried out within determinable tolerance areas. Suitable electronic apparatuses are available in practice and they also have the high signal process and evaluation speeds required for this application.

The manner of operation in accordance with the method of the invention is explained in the following with reference to FIGS. 1*a* to 1*d*.

FIG. 1 shows a product slicing procedure in a phase in which slices 14 are obtained due to the consistency of the cross-sectional shape of the product 10 which are of substantially the same size and which fall onto the first feeding device 20 while forming a stack. The feeding device 20 can be at rest during the stack formation procedure, be moved continuously or discontinuously from an upper position into its lower base position and/or be moved slightly forwardly or backwardly during the stack formation procedure in order to ensure an exact stack formation in dependence on the respective products to be sliced.

Once the required product stack has been completed and once the number of slices required in the stack has been reached, the stack is moved from the first feeding device 20 onto the second feed unit 34 and can then be further moved onto the feed unit 36 in the conveying direction 38 so that a sequence of stacks 24 can be obtained by an appropriate control of the overall feeding device 16 which preferably have equal mutual spacings and a certain maximum length 22 in the conveying direction 38, with the latter being above all of importance for shingled portions. If the end of a product is approached during the slicing procedure or if the start of a new product is sliced, the opto-electronic unit recognizes that chips or small slices 44 are being formed which have an undesirable outline shape or size. As long as the opto-electronic unit 40 determines such chips or slices do not conform to the desired values of the slices required, a pivoting away of the first feeding device 20 assures that these chips or small slices 44 are eliminated and enter into a collection container.

Figure 1B:
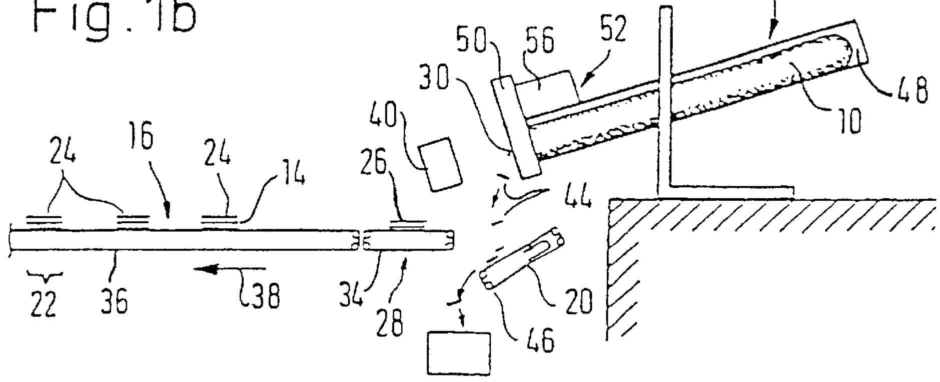

Before this pivoting away of the first feed unit 20 and the elimination of unusable chips and small slices takes place, the incomplete portion just being formed is moved—as can be seen in FIG. 1*b*—from the first feed unit 20 onto the second feed unit 34 into a parking position 28, with the displacement path 32 being exactly detected and stored so that when the opto-electronic unit 40 determines the first proper slice 10 in the course of the slicing of the product 10 or can predict its occurrence after certain further steps, an immediate or time-wise defined return of the incomplete portion 26 into the collection area on the first feeding device 20 takes place, with this feeding device 20 again being guided back to its base position.

Figure 1C:
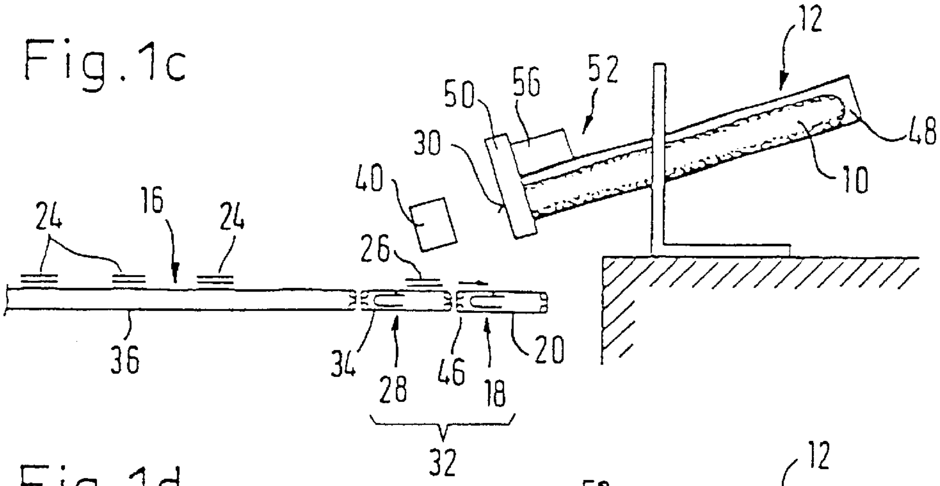

FIG. 1*c* shows the point in time of the return of the incomplete portion 26 into the collection area 18.

Figure 1D:
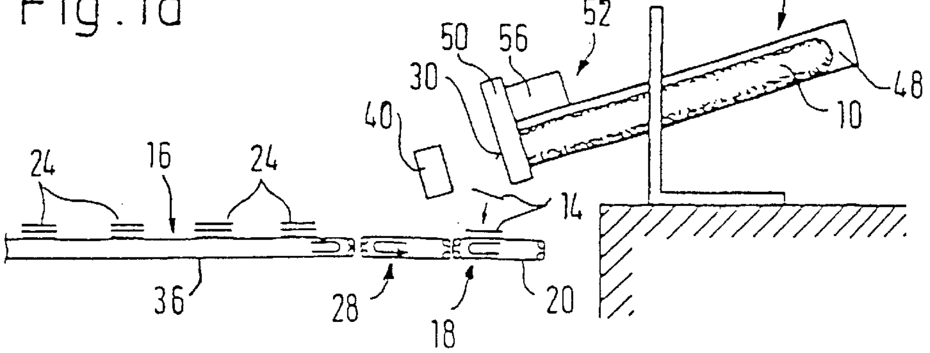

It can be seen in FIG. 1*d* that once the incomplete portion has been returned, a completion of this portion takes place by means of further slices 14 which take the pre-set desired value into account, and indeed are positionally accurate since the return of the initially incomplete portion into the collection area 18 is made while utilizing the recorded data such that the incomplete portion moves exactly into the position from which it was moved into the parking position. This can be done by means of incremental control or also by the use of scanning systems.

As can also be seen from FIG. 1*d*, it can also be ensured in the event of completion becoming necessary of an initially incomplete portion that the mutual spacing of the portions formed on the transportation feed unit 36 is always constant by a corresponding control of the overall feeding device and the appropriate cooperation of the part feed units, which facilitates the further processing and in particular the packaging of the portions.

In the embodiment described, the unusable chips or small slices 44 are eliminated by a downward pivoting away of the first feed unit 20. This elimination of unusable chips and small slices can, however, also take place in any other manner, for example by a backward running of the feed unit 20 or by a pivoting in and subsequently out of a suitable collection surface.

To ensure perfect formation of portions at high and very high cutting speeds, blank cuts, such as are known in the relevant technology by controlling the product supply, can be carried out between the individual portions or also in the phase of transfer of an incomplete portion into the parking position and its return into the collection area.

What is claimed is:

1. A method for slicing a food product with a slicing apparatus having a slicer, wherein the products are cut into slices and transported away with a feeding device in portions for further processing from a collection area disposed adjacent to the slicing apparatus, with a first feed unit having a length which can be substantially matched to a maximum length of a complete portion being used as the collection area and with an incomplete portion resulting in each case at a start and at an end of a product slicing procedure being completed after an intermediate positioning in a parking position and a return into the collection area by slices produced after the start of a further product slicing procedure and meeting determinable requirements, characterized in that unusable chips of small slices are eliminated by a downwardly pivoting away of the first feed unit; in that during the product slicing procedure a cut surface of the product is monitored as to whether it at least meets determinable size criteria for the supply of a slice to be sliced next into an incomplete portion and, if these criteria are not met, the product slicing procedure is interrupted and simultaneously a difference is registered between an actual value and a desired value of a size defining the complete portion; in that the incomplete portion is conveyed onto a second feed unit connected to the first feed unit into the parking position while surrounding a displacement path; in that the cut surface is then again monitored during the product slicing procedure of the next product of the same kind and, if the determined criteria are met, the incomplete portion is again positionally accurately moved back into the collection area in accordance with the displacement path and is completed; and in that finally the completed portion is conveyed out of the collection area by synchronization of at least the first feed unit with further feed elements of the feeding device.

2. A method for cutting a food product with a slicer into slices and transporting portions of slices with a transportation unit for further processing from a collection area disposed adjacent to the slicer, the transportation unit including a first feeding device being used as the collection area which has a length that substantially matches a maximum length of a complete portion, an incomplete portion resulting at a start and at an end of a product slicing procedure and being completed, following an intermediate positioning of the incomplete portion in a parking position and its return to the collection area, with slices produced after the start of a further product slicing procedure, the method comprising eliminating undesirably shaped slices from being added to the portion by downwardly pivoting the first feeding device; during the product slicing procedure monitoring a cut surface of the product as to whether it meets determinable size criteria for the supply of a slice to be sliced next into an incomplete portion and, if the criteria are not met, interrupting the product slicing procedure; conveying the incomplete portion onto a second feeding device connected to the first feeding device and into the parking position; thereafter monitoring the cut surface during the product slicing procedure of the next product and, if the determined criteria are met, positionally accurately moving the incomplete portion back into the collection area and completing the portion by cutting slices off the next product; and conveying the completed portion out of the collection area in a conveying direction by synchronization of at least the first feeding device with a further feed element.

3. A method in accordance with claim 2 wherein the incomplete portion is conveyed in the conveying direction from the collection area into the parking position.

4. A method in accordance with claim 2 wherein monitoring of the cut surface takes place by means of at least one opto-electronic unit.

5. A method in accordance with claim 2 including removing the undesirably shaped slices which occur at the start and at the end of the product slicing procedure from the collection area.

6. A method in accordance with claim 5 wherein the first end of the feed unit is downwardly lowered.

7. A method in accordance with claim 2 including making blank cuts at least during moving the incomplete portion from the parking position into the collection area.

8. A method in accordance with claim 2 including removing product ends generated at an end of the product slicing procedure from a vicinity of the slicer in the form of residual pieces.

9. A method in accordance with claim 5 wherein the first feed unit has a first end facing in a conveying direction of the transportation unit, and wherein removing the undesirably shaped slices comprises pivoting the first end of the first feeding device out of its position facing in the conveying direction.

10. A method in accordance with claim 9 wherein the positionally accurate return from the parking position into the collection area takes place on the basis of detection and control of conveyor times and conveyor speeds of the first feed unit and of the second feed unit.

11. A method for cutting a food product with a slicer into slices and arranging a plurality of severed slices and preventing the inclusion of undesirably shaped slices generated when the slicer severs slices from end portions of the food product, the method comprising collecting slices severed by the slicer at a collection area located proximate the slicer, monitoring the shape of slices being severed from the food product, when detecting undesirably shaped slices moving an incomplete portion of slices onto a temporary holding device remote from the collection area and along a controlled displacement path, continuing to sever slices from the product while monitoring the shape of the severed slices and discarding undesirably shaped slices from respective ends of the product, determining when slices severed from the food product have a desirable shape again and in response thereto repositioning the partial portion along the controlled displacement path to its original position at the collection area, thereafter continuing to add severed slices to the incomplete portion until a sufficient number of slices have been collected at the collection area to constitute a complete portion, and thereafter removing the completed portion of slices from the collection area.

* * * * *